(No Model.)
W. E. BROOKE.
DETACHABLE SAW TOOTH.
No. 258,362. Patented May 23, 1882.
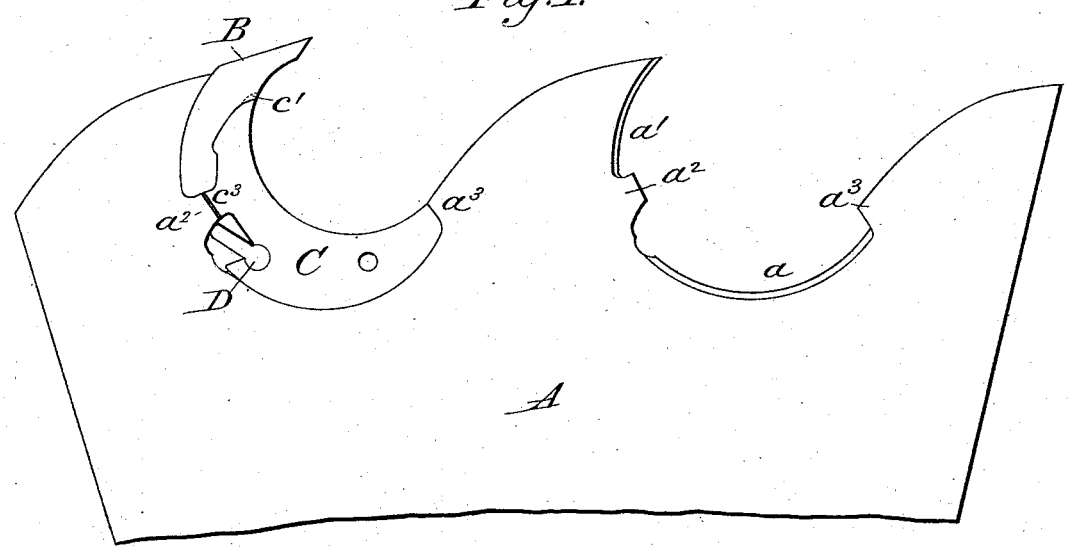
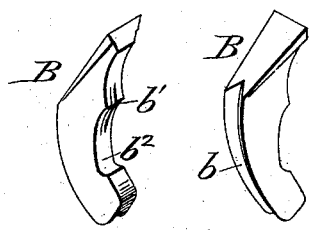
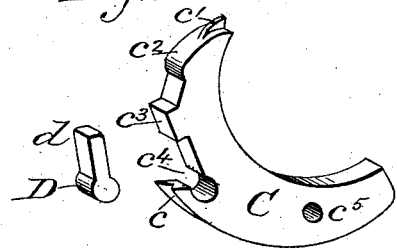
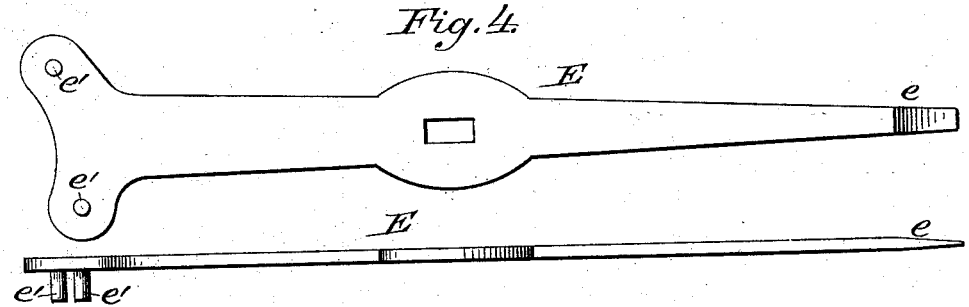
Attest:
F. H. Schott.
N. R. Brown.
Inventor:
William E. Brooke
Geo. J. C. Pasker atty.

UNITED STATES PATENT OFFICE.

WILLIAM E. BROOKE, OF TRENTON, NEW JERSEY, ASSIGNOR TO THE AMERICAN SAW COMPANY, OF SAME PLACE.

DETACHABLE SAW-TOOTH.

SPECIFICATION forming part of Letters Patent No. 258,362, dated May 23, 1882.

Application filed January 14, 1882. (No model.)

*To all whom it may concern:*

Be it known that I, WILLIAM E. BROOKE, a citizen of the United States, residing at Trenton, in the county of Mercer and State of New Jersey, have invented certain new and useful Improvements in Detachable Saw-Teeth; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in that class of saws having insertible saw-teeth, for which Letters Patent No. 205,042 were granted to me June 18, 1878, the object being to secure the movable teeth of a saw by means of a lock-plate and latch in such a manner that the saw-teeth may be readily removed and replaced without injurious strain upon the saw plate or blade; and the invention consists in the combination, with a recessed saw-plate, an insertible saw-tooth, and a spring locking-plate, of a latch having certain peculiarities of form, as hereinafter more fully set forth.

In the annexed drawings, which fully illustrate the invention, Figure 1 is a side view of a section of saw with a tooth inserted in one recess, while the adjacent recess is left vacant to show its form more plainly. Fig. 2 represents perspective views of the movable tooth. Fig. 3 represents perspective views of the spring locking-plate and latch, and Fig. 4 shows a plan and edge view of the implement used for removing and replacing the teeth.

Like letters indicate like parts.

A is the saw plate or blade; B, the movable tooth; C, the spring locking-plate, and D the latch.

The saw-plate A is provided with recesses $a$ $a'$ for the reception of the locking-plate and tooth, respectively, and these recesses are tongued or beveled to correspond with grooves $b$ and $c$, formed in the back edges of the tooth and plate.

The tooth B is expanded or swaged at its point in the usual manner, so that it will cut a kerf of sufficient width to clear the saw-plate, thus obviating excessive friction and consequent heating of the plate. The back edge of the tooth, in which is formed the triangular or V-shaped groove $b$, may be straight or of convex outline, as desired, so as to correspond with the form of the recess $a'$ in the saw-plate, and when in position rests against a projection, $a^2$, which separates said recess from that formed for the reception of the locking-plate. In the front edge of the tooth B, which is preferably formed with a double concave, is a narrow groove or notch, $b'$, for the reception of a tongue, $c'$, at the end of the locking-plate, which prevents all lateral movement of the tooth.

The spring locking-plate has a general curved or semi-lunar outline, its shorter side or edge forming a continuous throat in connection with the outer concaved portion of the tooth. On the longer side of this locking-plate, adjoining the tongue $c'$, is a curved projection, $c^2$, which fits within the concaved portion $b^2$ of the tooth. The locking-plate is also provided with an abutment, $c^3$, corresponding with the projection $a^2$ of the saw-plate, and below or to the inner side of this abutment is a recess, $c^4$, for the reception of the latch D, by means of which the tooth and its locking-plate are secured in position. The lower end of the spring locking-plate abuts firmly against the projection $a^3$ of the saw-plate, and by means of the groove $c$, which gives it a firm seat upon the corresponding edge of the recess $a$, it is securely held from lateral displacement.

The latch D, by which the parts are secured, consists of a circular portion or disk having an arm, $d$, that projects from the edge of said disk. This disk or pivotal portion of the latch is fitted in a partly-circular opening formed in the locking-plate at the lower end of the recess $c^4$, and is secured therein by upsetting a little head on each end or side, so as to enable the latch to be freely movable without liability of slipping out of place. The arm of this latch is of such size and form that it will fit accurately within the recess $c^4$ when turned back, but may be partially rotated by means of a suitable tool, so as to cause the end of the arm $d$ to project within the space below the projection $a^2$ of the saw-plate, and by bearing against said projection force the upper edge of the spring locking-plate firmly against the lower and outer edge of the tooth, thereby holding the same securely in position. If desired, the locking-plate and tooth may be formed in one piece.

In order to remove the tooth and locking-plate, the tool E (shown in Fig. 4) may be first used by placing its end $e$ below the arm $d$ of the latch, between the latch and saw-plate, and pressing said arm back into the recess $c^4$, which relaxes the pressure of the locking-plate upon the tooth. The implement is then held by its opposite end, while the pins $e'$ $e'$, with which it is provided, are respectively inserted into the circular opening $c^5$ of the locking-plate and into the space below the arm of the latch, when by turning the tool E outward, as a wrench, the locking-plate and tooth or bit will be immediately detached. To reinsert the tooth it may be placed in its proper position in the saw-plate and the spring locking-plate brought forcibly against it by means of a slight blow with the tool E, after which the latch is turned down by inserting the sharp end $e$ of the tool into the slight space above the arm $d$, between it and the locking-plate, thus retaining the parts firmly in position until again released in the manner above described.

A movable tooth inserted and secured in the manner described will not exert any injurious strain upon the saw-plate, and may be removed and replaced with greater facility than heretofore.

I am aware that a locking-plate adapted to fit recesses formed in the saw plate and tooth is not new, and I am also aware that such plates have been secured by rivets and wedges. These, however, I do not claim; but,

Having thus described my invention, what I claim as new, and desire to secure by Letters Patent, is—

The combination, with the saw-plate A, having recesses $a$ $a'$ and projection $a^2$, and the movable tooth B, provided with grooves $b$ $b'$ and concave surface $b^2$, of the spring locking-plate C, having groove $c$, tongue $c'$, projections $c^2$ $c^3$, and recess $c^4$, and the latch D, pivoted in the recess $c^4$, and having an arm, $d$, adapted to bear against the projection $a^2$, thereby securing the parts, substantially as described.

In testimony whereof I affix my signature in presence of two witnesses.

WM. E. BROOKE.

Witnesses:
PHILIP MAURO,
A. R. BROWN.